(12) United States Patent
Jang et al.

(10) Patent No.: US 11,628,706 B2
(45) Date of Patent: Apr. 18, 2023

(54) COOLANT HEATER

(71) Applicants: Hanon Systems, Daejeon (KR); DAEWOO ELECTRONIC COMPONENTS CO., LTD., Jeollabuk-do (KR)

(72) Inventors: Kil Sang Jang, Daejeon (KR); Ji Hoon Park, Daejeon (KR); Jeong Hyun Son, Daejeon (KR); Man Ok Lee, Daejeon (KR); Bok Sun Kang, Daejeon (KR); Young Chul Kim, Daejeon (KR); Hak Kyu Kim, Daejeon (KR); Yong Jin Moon, Daejeon (KR); Seung Ho Lee, Daejeon (KR); Hyun Seok Jung, Daejeon (KR); Kyung Seok Cho, Daejeon (KR); Yong Ha Chae, Daejeon (KR)

(73) Assignees: Hanon Systems, Daejeon (KR); DAEWOO ELECTRONIC COMPONENTS CO., LTD., Jeollabuk-do (KR)

(*) Notice: Subject to any disclaimer, the term of this patent is extended or adjusted under 35 U.S.C. 154(b) by 692 days.

(21) Appl. No.: 16/495,507

(22) PCT Filed: Aug. 22, 2018

(86) PCT No.: PCT/KR2018/009642
§ 371 (c)(1),
(2) Date: Sep. 19, 2019

(87) PCT Pub. No.: WO2019/045353
PCT Pub. Date: Mar. 7, 2019

(65) Prior Publication Data
US 2020/0094653 A1   Mar. 26, 2020

(30) Foreign Application Priority Data

Aug. 31, 2017  (KR) .................. 10-2017-0111340
Aug. 31, 2017  (KR) .................. 10-2017-0111362
Nov. 13, 2017  (KR) .................. 10-2017-0150584

(51) Int. Cl.
B60H 1/22    (2006.01)
B60H 1/00    (2006.01)
F24H 9/02    (2006.01)

(52) U.S. Cl.
CPC ....... B60H 1/2221 (2013.01); B60H 1/00885 (2013.01); B60H 1/00392 (2013.01);
(Continued)

(58) Field of Classification Search
CPC ............ B60H 1/2221; B60H 1/00885; B60H 1/00392; B60H 1/034; B60H 2001/00307;
(Continued)

(56) References Cited

U.S. PATENT DOCUMENTS

2012/0295141 A1* 11/2012 Allen ................. H01M 10/613
2017/0307257 A1* 10/2017 Braun ................. F24H 3/0411
2020/0269656 A1*  8/2020 Kim .......................... H05B 6/42

FOREIGN PATENT DOCUMENTS

DE    10051867 A1 *  4/2002  .......... B60H 1/2209
EP    1291202 A2       3/2003
(Continued)

OTHER PUBLICATIONS

Michael Humberg, Heating device in particular vehicle heating device with temperature sensor (Year: 2002).*

(Continued)

Primary Examiner — Steven B McAllister
Assistant Examiner — Daniel E. Namay
(74) Attorney, Agent, or Firm — Norton Rose Fulbright US LLP; James R. Crawford

(57) ABSTRACT

The present invention relates to a coolant heater comprising: a heating element for heating coolant; a first housing for accommodating the heating element; a cover plate for sealing the first housing in which the heating element is accommodated; a temperature fuse provided in an external space formed by coupling the first housing and the cover plate, and disposed to be adjacent to the cover plate; and a second housing for pressing the temperature fuse so as to pressurize the same toward the cover plate, wherein overheat sensing responsiveness of the heating element is improved such that (Continued)

the overheat of the heating element can be prevented, and failure factors in a part in which the temperature fuse is coupled are reduced such that a durability is improved.

21 Claims, 16 Drawing Sheets

(52) U.S. Cl.
CPC .............. *B60H 2001/00307* (2013.01); *B60H 2001/00949* (2013.01); *B60H 2001/2278* (2013.01); *F24H 9/02* (2013.01)

(58) Field of Classification Search
CPC .............. B60H 2001/00949; B60H 2001/2278; B60H 2001/2231; F24H 9/02; F24H 9/2014; F24H 1/0018; F24H 3/002; F24H 3/004; F24H 15/128; F24H 15/212; F24H 15/37
USPC .......... 237/12.3 B; 126/99 R, 248, 249, 250, 126/110 R, 110 D, 116 R, 116 A, 116 C, 126/110, 9.99 A
See application file for complete search history.

(56) References Cited

FOREIGN PATENT DOCUMENTS

| | | |
|---|---|---|
| JP | S59150247 A | 8/1984 |
| JP | 2002178741 A | 6/2002 |
| JP | 2006520300 A | 9/2006 |
| JP | 2008056044 A | 3/2008 |
| JP | 2016180547 A | 10/2016 |
| JP | 2017015382 A | 1/2017 |
| KR | 20090050165 A | 5/2009 |
| KR | 20150070768 A | 6/2015 |
| KR | 20150070771 A | 6/2015 |
| KR | 20150098862 A | 8/2015 |
| KR | 20160082661 A | 7/2016 |

OTHER PUBLICATIONS

International Search Report issued in PCT/KR2018/009642 dated Nov. 23, 2018.

* cited by examiner 41 (PTC ELECTRODE PLATE)

PRIOR ART

COOLANT HEATER

This patent application is a national phase under 35 U.S.C. § 371 of International Application No. PCT/KR2018/009642 filed Aug. 22, 2018, which claims priority from Korean Patent Application Nos. 10-2017-0111340, filed Aug. 31, 2017, 10-2017-0111362, filed Aug. 31, 2017, and 10-2017-0150584, filed Nov. 13, 2017, each of which is hereby incorporated herein by reference in its entirety for all purposes.

TECHNICAL FIELD

The present invention relates to a coolant heater capable of heating a coolant of a vehicle using a sheath heater and preventing the sheath heater, which is a heating element, from being overheated.

BACKGROUND ART

A vehicle having an engine, with gasoline, diesel, or the like as an energy source, as a driving source is currently the most general type of vehicle. However, such an energy source for a vehicle causes various problems such as environmental pollution and decreasing oil reserves, the necessity of new energy sources is increasing. Accordingly, electric vehicles, hybrid vehicles, fuel cell vehicles, and the like are being practically used or being developed.

However, it is impossible or difficult to apply a heating system using a coolant to an electric vehicle, a hybrid vehicle, or a fuel cell vehicle, unlike a conventional vehicle using an engine with oil as an energy source. That is, in the conventional vehicle having an engine, with oil as an energy source, as a driving source, a great amount of heat is generated from the engine, a coolant circulation system for cooling the engine is provided, and the heat absorbed from the engine to the coolant is used for indoor heating. However, the driving source of the electric vehicle, the hybrid vehicle, or the fuel cell vehicle does not generate such a great amount of heat as generated from the engine. For this reason, there has been a limit in using the conventional heating system.

Accordingly, for the electric vehicle, the hybrid vehicle, the fuel cell vehicle, or the like, various studies have been performed, for example, a heat pump to be used as a heat source is added to an air conditioning system, or a separate heat source such as an electric heater is provided. The electric heater is capable of heating the coolant in an easier way without greatly affecting the air conditioning system, and thus is currently widely used.

Here, for the electric heater, there are an air heating type heater that directly heats air blown into the interior of the vehicle, and a coolant heating type heater (or a coolant heater) that heats the coolant.

Japanese Patent Laid-Open Publication No. 2008-056044 entitled "HEATING DEVICE FOR HEAT MEDIUM AND AIR CONDITIONER FOR VEHICLE USING THE SAME", which relates to a dual-type coolant heating type heater, discloses a coolant heater having a structure for increasing heat transfer efficiency between a positive temperature coefficient (PTC) electrode plate and a coolant to heat the coolant in a more effective manner, by disposing heat medium circulation boxes 30 and 50 to closely adhere to an upper portion and a lower portion of the PTC electrode plate 41 that is a heat generating source, sealing an upper side of the upper heat medium circulation box 30 and a lower side of the lower heat medium circulation box 50 by means of a board accommodating box 20 and a cover respectively, and allowing the coolant to flow through circulating channels 33 and 54 that are spaces formed between plate-shaped fins, as shown in FIG. 1.

However, the coolant heater described above has disadvantages in that the heater may be stopped due to the high temperature of the heating element, the heating element may easily be damaged due to the extreme variation in temperature of the heating element during operation, and there may be a risk of fire occurrence due to the incomplete overheat prevention function of the heating element.

RELATED ART DOCUMENT

Patent Document

JP 2008-056044 A (Mar. 13, 2008)

DISCLOSURE

Technical Problem

An object of the present invention is to provide a coolant heater capable of preventing the heating element from being overheated by improving overheat sensing responsiveness of the heating element, and improving durability by reducing a failure factor in a part in which a temperature fuse is coupled.

Technical Solution

In one general aspect, a coolant heater 1000 includes: a heating element 300 for heating a coolant; a first housing 100 for accommodating the heating element 300; a cover plate 200 for sealing the first housing 100 in which the heating element 300 is accommodated; a temperature fuse 500 provided in an external space formed by coupling the first housing 100 and the cover plate 200, and disposed to be adjacent to the cover plate 200; and a second housing 600 for pressing the temperature fuse 500 to be pressurized toward the cover plate 200.

The first housing 100 may be formed in a concave container shape, with an upper side thereof being open, and include an inlet 110 for introducing the coolant and an outlet 120 for discharging the coolant. The cover plate 200 may be coupled to cover and close the open upper side of the first housing 100. The second housing 600 may be formed in the concave container shape, with a lower side thereof being open, and coupled to an upper end portion of the first housing 100.

The second housing 600 may include a support (630) protruding downwardly from a lower surface thereof at a position corresponding to the temperature fuse 500, and an upper surface of the temperature fuse 500 may be in contact with and supported by the support 630.

The support 630 of the second housing 600 may include a guide 631 extending downwardly from a lower end thereof, and an upper portion of the temperature fuse 500 may be partially inserted into an inner side surrounded by the guide 631.

The second housing 600 may include a plurality of reinforcing ribs 640 protruding from a surface thereof.

The cover plate 200 may include a seating groove 220 formed to be concave downwardly from an upper surface thereof, and a lower portion of the temperature fuse 500 may be partially inserted into the seating groove 220.

The coolant heater may further include an elastic means 800 interposed between the temperature fuse 500 and the second housing 600, with a lower end thereof being supported by the temperature fuse 500 and an upper end thereof being supported by the second housing 600.

The coolant heater may further include a cover 900 coupled and fixed to the second housing 600, with an opening 910 penetrating through upper and lower surfaces thereof. A lower portion of a body 510 of the temperature fuse 500 may be inserted into the opening 910 of the cover 900. The temperature fuse 500 may include connection tabs 520 protruding from an upper portion of the body 510 towards both sides in a width direction or in a length direction, and the connection tabs 520 may be disposed between a lower surface of the second housing 600 and an upper surface of the cover 900.

The second housing 600 may include a seating section 650 protruding from a lower surface thereof, and the elastic means 800 is inserted into an inner space of the seating section 650 to be seated therein.

The coolant heater may further include a push plate 810 including: a support plate 811 disposed between the temperature fuse 500 and the elastic means 800, with an upper surface thereof being in contact with the elastic means 800 and a lower surface thereof being in contact with the temperature fuse 500; and a first guide 812 protruding upwardly from the support plate 811 and fitted around an outer surface of the seating section 650.

The first guide 812 of the push plate 810 may include a slit 813 penetrating through an inner surface and an outer surface thereof in a width direction or in a length direction.

The seating section 650 may include a rotation preventing protrusion 651 protruding from an outer circumferential surface thereof, and the rotation preventing protrusion 651 may be inserted into the slit 813 of the push plate 810 to be coupled thereto.

The second housing 600 may include a second guide 660 protruding from the lower surface thereof, and the push plate 810 may be disposed in an inner space surrounded by the second guide 660.

The support plate 811 of the push plate 810 may be formed in a polygonal shape when viewed in a height direction, and the second guide 660 of the second housing 600 may be formed to correspond in shape to the support plate 811.

The coolant heater may further include a sealing member 700 fitted around a peripheral portion of the cover plate 200 to cover an entire edge of the cover plate 200, and formed to cover all three surfaces at the peripheral portion of the cover plate 200. In a state in which the sealing member 700 is fitted around the peripheral portion of the cover plate 200, the peripheral portion of the cover plate 200 including the sealing member 700 may be interposed between an upper end portion of the first housing 100 and a lower end portion of the second housing 600 to closely adhere thereto.

Inner ends 701 of the sealing member 700 may protrude inwardly further than inner wall surfaces of the first housing 100 and the second housing 600 to be coupled thereto.

The sealing member 700 may include a through hole 731 penetrating through both surfaces thereof to enable communication between an inner space into which the cover plate 200 is inserted and the outside.

The first housing 100 may include a sealing member seating groove 130 formed to be concave downwardly from an upper surface of the upper end portion thereof, and the sealing member 700 may be inserted into the sealing member seating groove 130.

A width W2 of the sealing member 700 may be larger than a width W1 of the sealing member seating groove 130.

The sealing member 700 may include protrusions 712 and 722 formed in a rugged form at an upper outer surface and a lower outer surface thereof, respectively.

Advantageous Effects

The coolant heater according to the present invention is capable of improving overheat sensing responsiveness of the heating element, thereby preventing the overheating of the heating element.

In addition, failure factors in a part in which the temperature fuse is coupled can be reduced, thereby improving durability.

BEST MODE

Hereinafter, a coolant heater according to the present invention having the configuration as described above will be described in detail with reference to the accompanying drawings.

Figure 1:
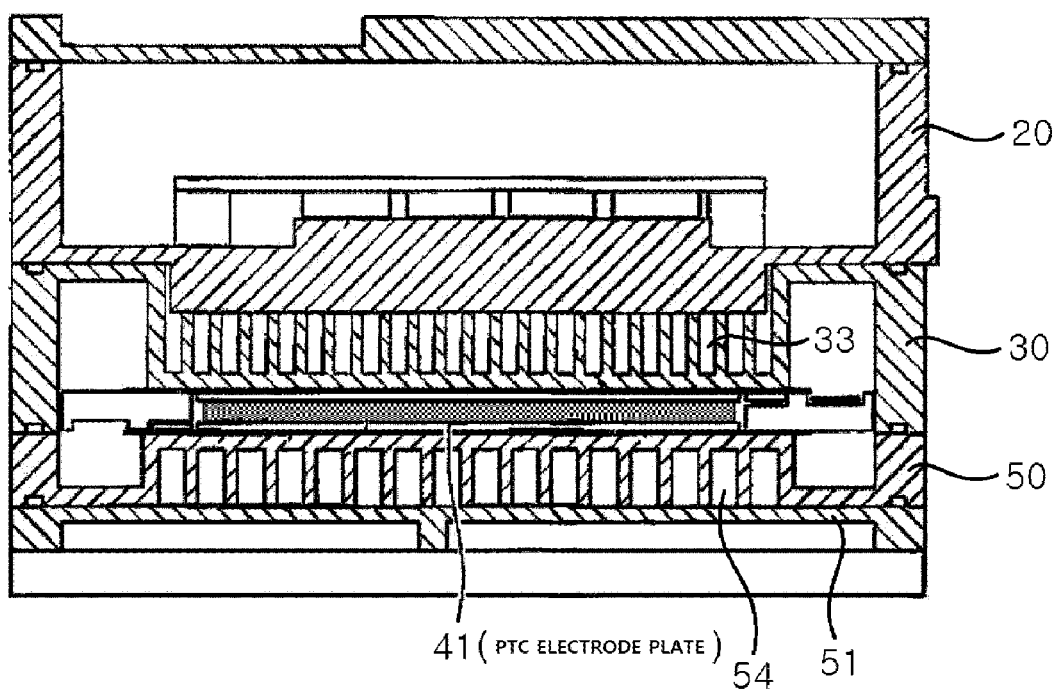
FIG. 1 is a cross-sectional view illustrating a conventional coolant heater.
Figure 2:
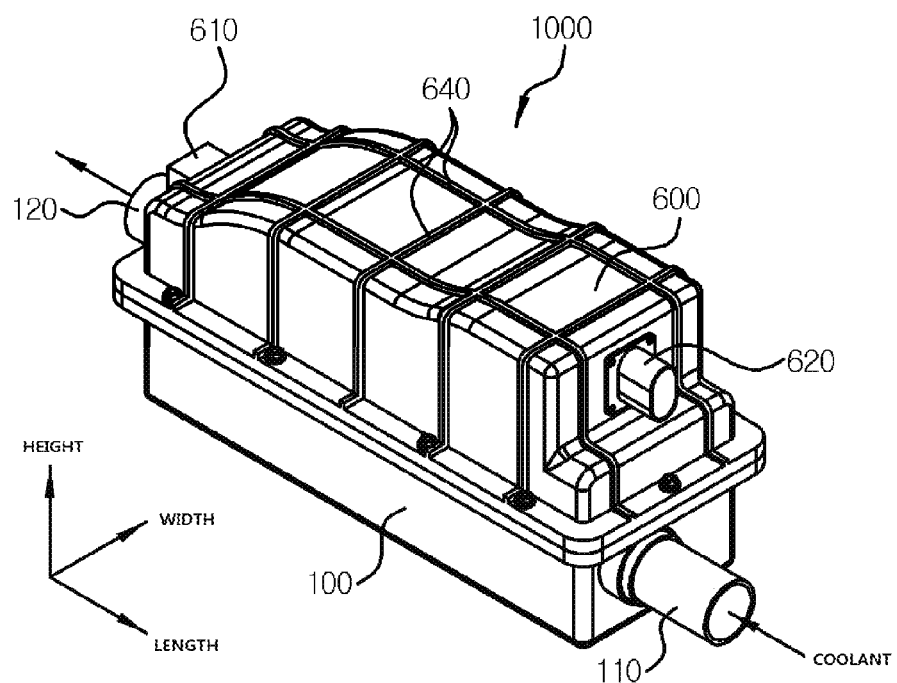
FIG. 2 is an assembled perspective view illustrating a coolant heater according to a first exemplary embodiment of the present invention.
Figure 3:
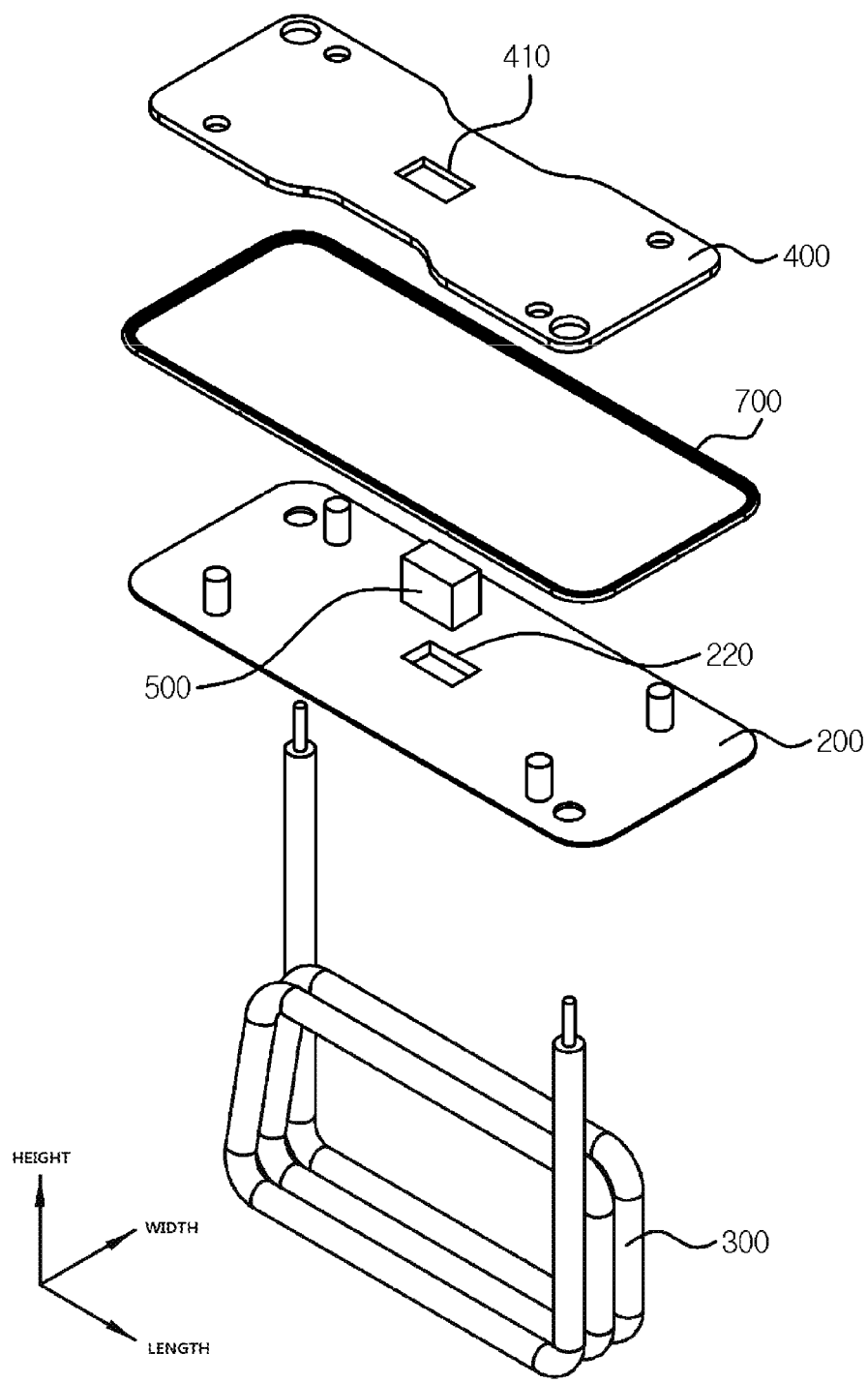
FIG. 3 is a partial exploded perspective view illustrating the coolant heater according to the first exemplary embodiment of the present invention.
Figure 4:
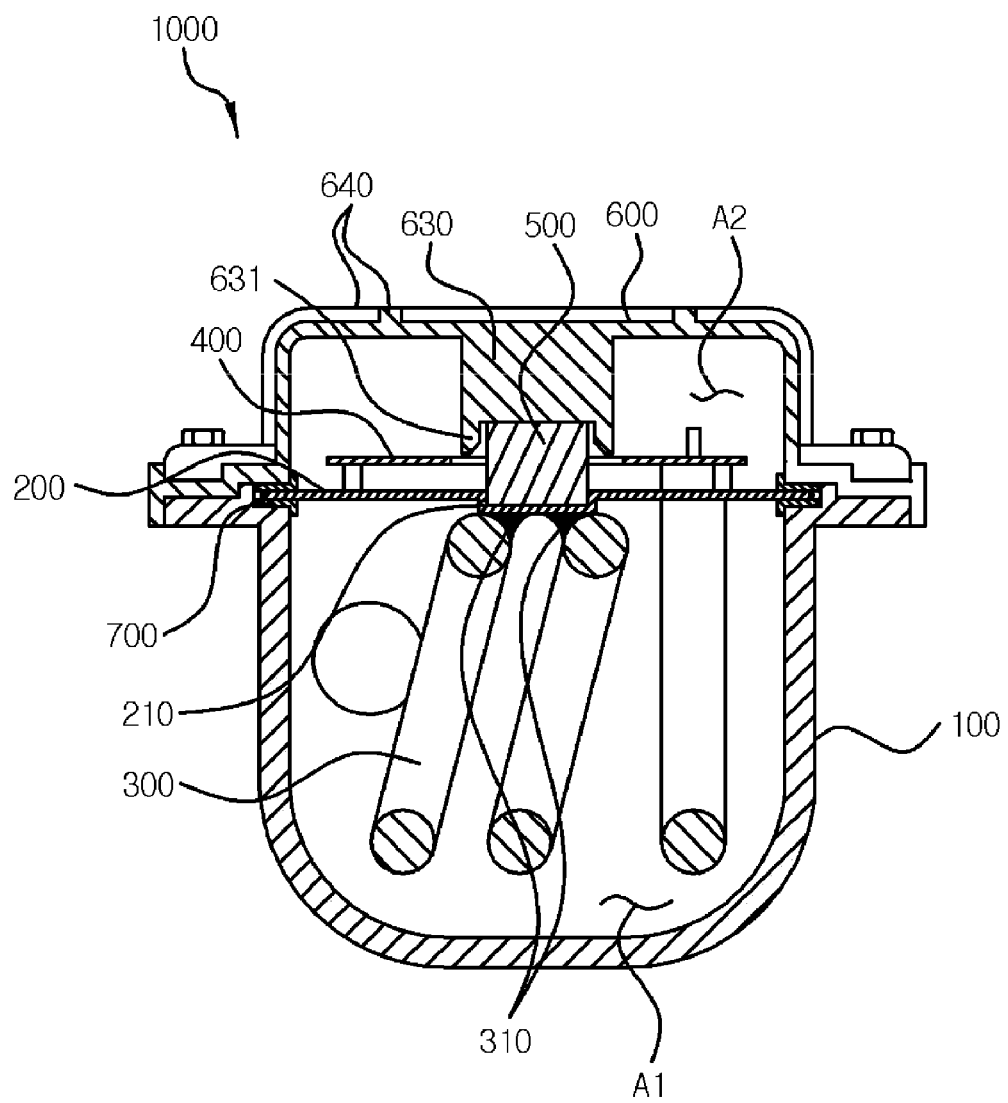
FIG. 4 is a side cross-sectional view illustrating the coolant heater according to the first exemplary embodiment of the present invention.
Figure 5:
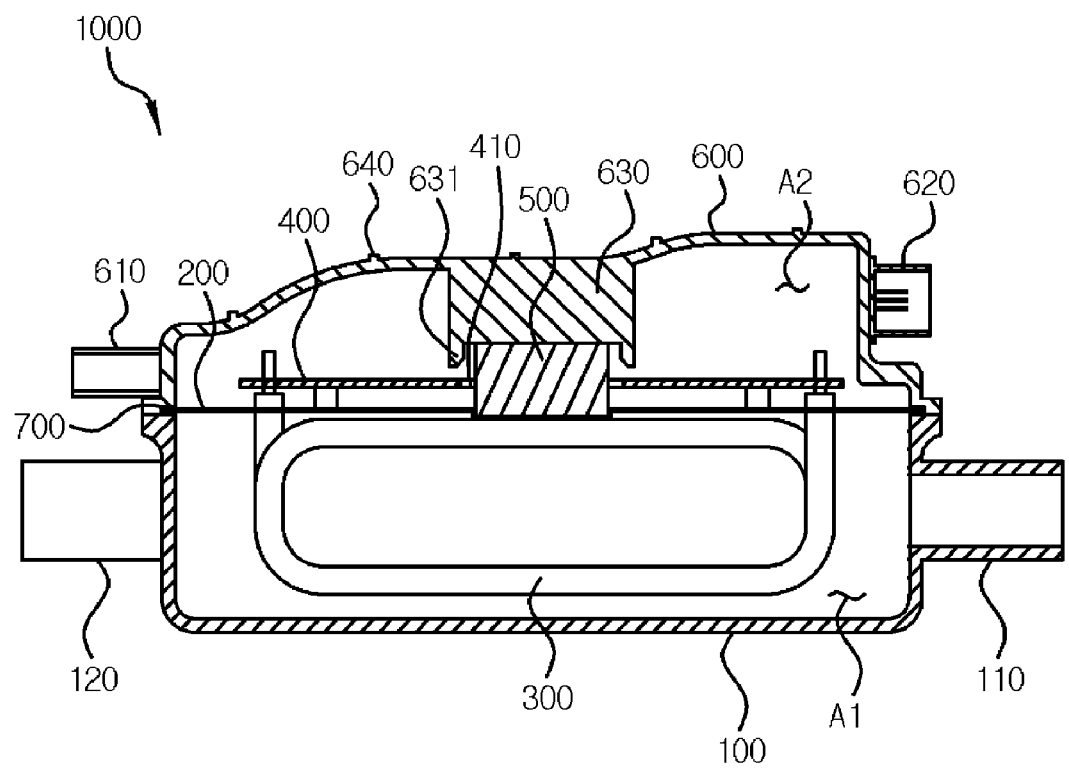
FIG. 5 is a front cross-sectional view illustrating the coolant heater according to the first exemplary embodiment of the present invention.
Figure 6:
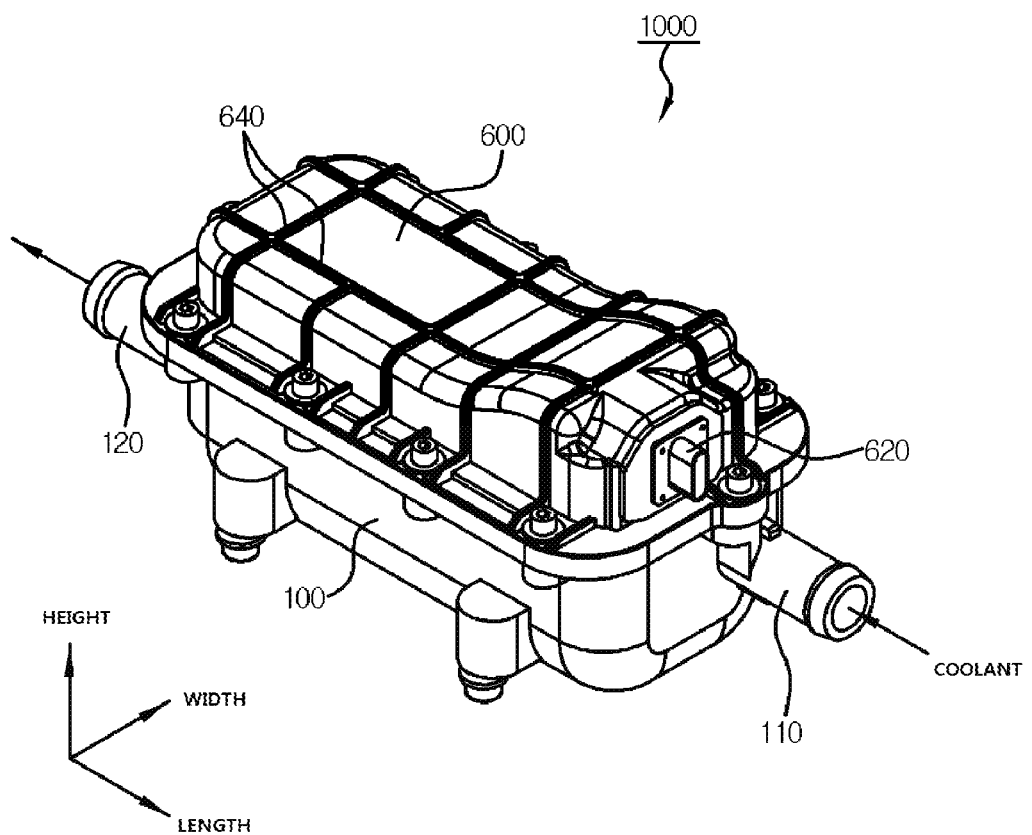
FIG. 6 is an assembled perspective view illustrating a coolant heater according to a second exemplary embodiment of the present invention.
Figure 7:
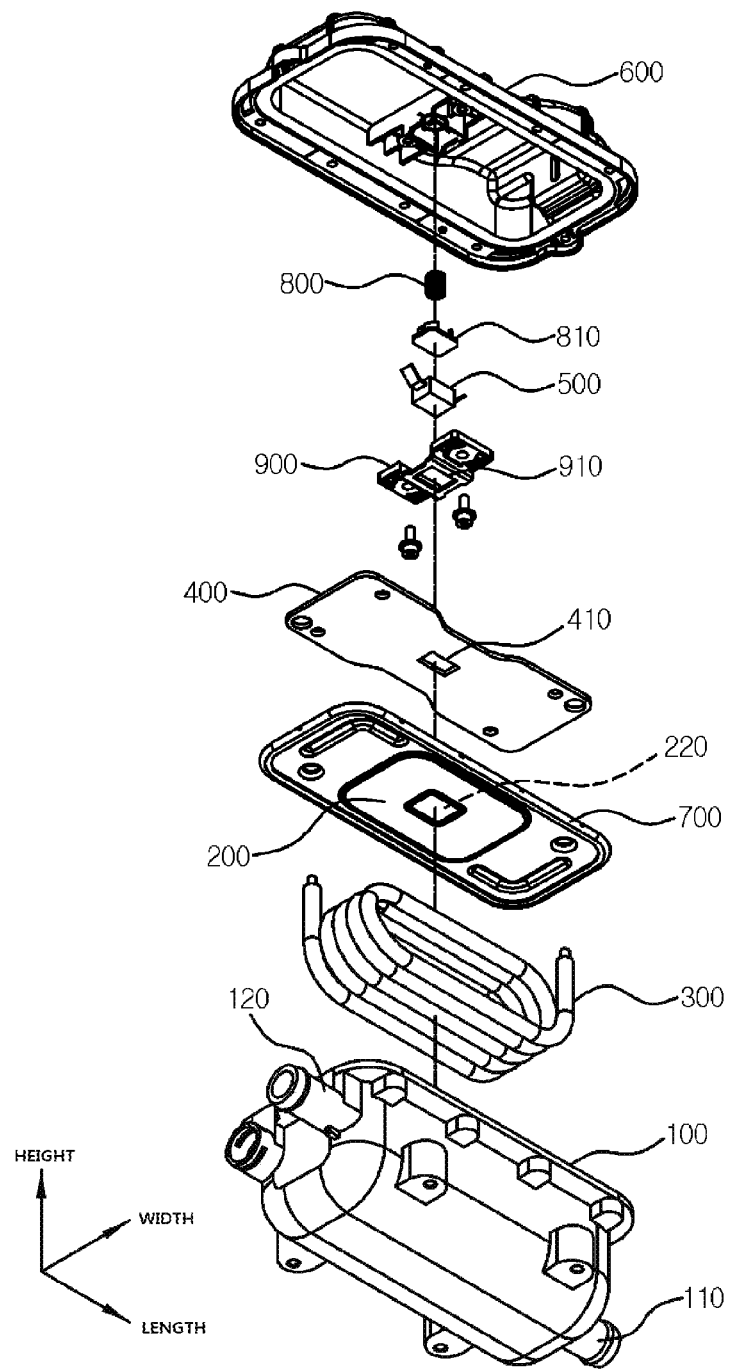
FIG. 7 is an exploded perspective view illustrating the coolant heater according to the second exemplary embodiment of the present invention.
Figure 8:
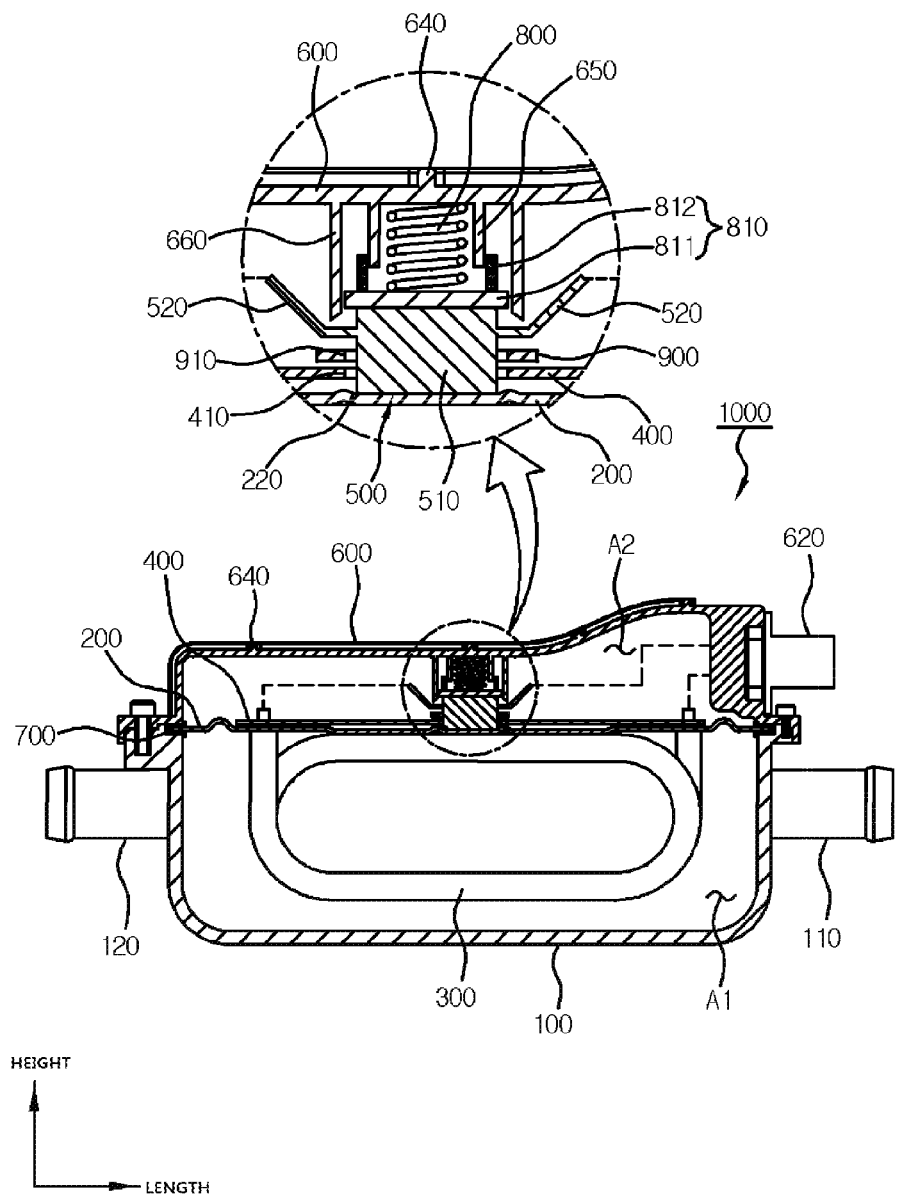
FIG. 8 is a front cross-sectional view illustrating the coolant heater according to the second exemplary embodiment of the present invention.
Figure 9:
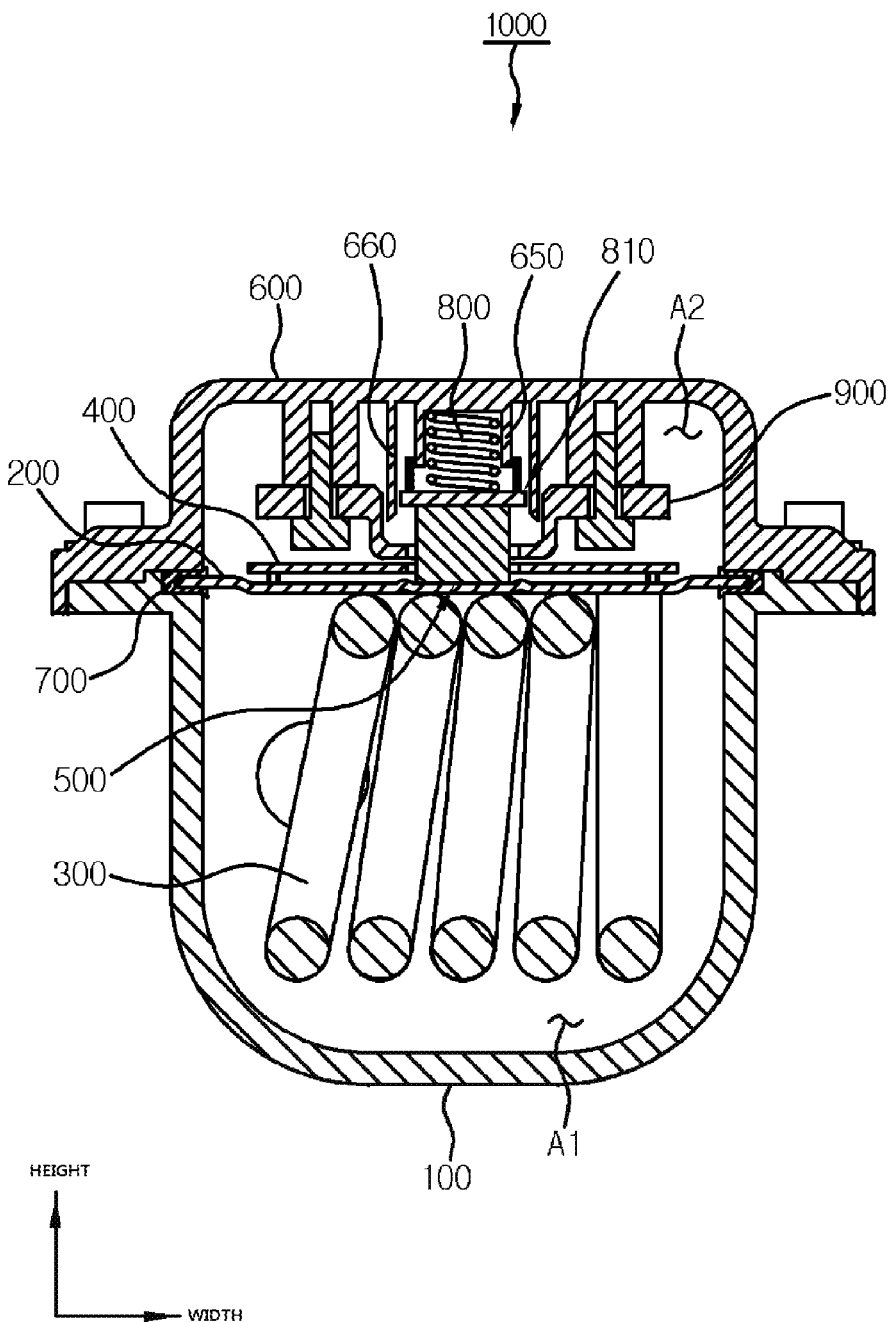
FIG. 9 is a side cross-sectional view illustrating the coolant heater according to the second exemplary embodiment of the present invention.

FIG. 2 is an assembled perspective view illustrating a coolant heater according to a first exemplary embodiment of the present invention, FIG. 3 is a partial exploded perspective view illustrating the coolant heater according to the first exemplary embodiment of the present invention, and FIGS. 4 and 5 are a side cross-sectional view and a front cross-sectional view illustrating the coolant heater according to the first exemplary embodiment of the present invention.

As illustrated therein, the coolant heater 1000 according to the first exemplary embodiment of the present invention may include: a first housing 100 formed in a concave container shape, with an upper side thereof being open, and including an inlet 110 for introducing a coolant and an outlet 120 for discharging the coolant; a cover plate 200 coupled to cover and close the open upper side of the first housing 100; a heating element 300 provided in an internal space formed by coupling the first housing 100 and the cover plate 200; a controller 400 disposed above the cover plate 200 to be spaced apart therefrom, and connected to the heating element 300; a temperature fuse 500 disposed on the cover plate 200 and electrically connected to the controller 400, with a lower surface thereof being in contact with the cover plate 200; and a second housing 600 formed in the concave container shape, with a lower side thereof being open, coupled to an upper end portion of the first housing 100, and including a support 630 protruding downwardly from a lower surface thereof at a position corresponding to the temperature fuse 500, such that an upper surface of the temperature fuse 500 is in contact with and supported by the support 630.

The first housing 100 may be disposed in the shape of a container that is concave downwardly with its open side facing upwardly. The inlet 110 for introducing the coolant may be formed at one side of the first housing 100 in a length direction, and the outlet 120 for discharging the coolant may be formed at the other side of the first housing 100 in the length direction. The first housing 100 may be formed of a metal material as an example, or may be formed of another material or shape in various manners.

The cover plate 200 may be coupled to the first housing 100 to cover and close the open upper side of the first housing 100, and the open upper side of the first housing 100 may be sealed by the cover plate 200. A first space A1, which is the internal space formed by coupling the first housing 100 and the cover plate 200, is a coolant flow path for the coolant to flow therein. When the coolant is introduced into an inlet pipe, which is the inlet 110, the coolant may pass through the first space A1 of the first housing 100 and may be discharged through an outlet pipe, which is the outlet 120. The cover plate 200 may be formed as a flat plate of a metal material, or may be formed of another material or shape in various manners.

The heating element 300 may be a heating element capable of generating heat in various types and shapes. As an example, a sheath heater may be used. The sheath heater is an electric heater capable of heat generation based on electric resistance caused by an electric heating wire that is embedded in a protective tube, and a tubular heater in which the electric heating wire is embedded in a coil shape in a metallic protective tube and an insulating magnesium oxide powder is filled therein to insulate the electric heating wire and the protective tube. The sheath heater may be formed in a coil type by winding a long tubular heater several times, or may be formed in another shape in various manners. The heating element 300 may be disposed under the cover plate 200 and accommodated in the first housing 100, and both ends of the heating element 300 in the length direction may be coupled and fixed to the cover plate 200. Also, both the ends of the heating element 300 in the length direction may penetrate through the cover plate 200 and protrude upwardly further than an upper surface of the cover plate 200, and both the ends of the heating element 300 may be formed in a linear shape upwardly from ends of both coil-like wounded portions and the linear sections may be coupled to penetrate through the cover plate 200. At this point, the linear sections of the heating element 300 penetrating through the cover plate 200 may be coupled to the cover plate 200 by welding or the like and the connection section may be sealed, or a sealing material may be used to seal a potion in which the heating element 300 penetrates through the cover plate 200.

The second housing 600 may be formed of a plastic material as an example, and may be formed in the shape of a container that is concave upwardly with its open side facing downward. Further, the second housing 600 may be coupled to the upper end portion of the first housing 100. As an example, the upper end portion of the first housing 100 may be disposed to be in contact with an lower end portion of the second housing 600 so as to be coupled thereto. The first housing 100 may include a plurality of fastening holes which are spaced apart from each other along a periphery of the upper end portion thereof, and the second housing 600 may include through holes formed at positions corresponding to the plurality of fastening holes. The first housing 100 and the second housing 600 may be coupled by separate fastening means. A second space A2, which is an internal space formed by coupling the second housing 600 and the cover plate 200, may contain a controller 400, a temperature fuse 500, and the like therein. At this point, a sealing member 700 of an elastic material such as rubber may be fitted around a peripheral portion of the cover plate 200 to cover an entire edge of the cover plate 200. In the state in which the sealing member 700 is coupled to the cover plate 200, the peripheral portion of the cover plate 200 including the sealing member 700 is interposed between the upper end portion of the first housing 100 and the lower end portion of the second housing 600 to closely adhere thereto. As a result, the first space A1 and the second space A2 can be sealed by the sealing member 700 so as not to communicate with each other.

The controller 400, which serves to control the operation of the heating element 300, may be disposed above the cover plate 200 in parallel to be spaced from each other. The controller 400 may be coupled and fixed to supports protruding upwardly from the cover plate 200 by using fastening means or the like. Both the ends of the heating element 300, which have penetrated through the cover plate 200 and protrude above the cover plate 200, may be coupled to the controller 400 and electrically connected thereto.

The temperature fuse 500 may be formed of a bimetal or the like that is capable of blocking the current flowing when the temperature exceeds a specific value to stop the operation of the controller 400, and the temperature fuse 500 may be attached to be electrically connected to the controller 400 and to be in contact with the cover plate 200. At this point, the temperature fuse 500 may partially be inserted into a seating groove 220 formed to be concave downwardly from the upper surface of the cover plate 200, so that the temperature fuse 500 is disposed to be in contact with the upper surface of the cover plate 200. As illustrated, the second housing 600 may also include a low voltage connector 610 and a high voltage connector 620, and the connectors 610 and 620 may be electrically connected to the controller 400.

Here, the second housing 600 may include a support 630 protruding downwardly from the lower surface thereof at a position corresponding to the temperature fuse 500, and the upper surface of the temperature fuse 500 is in contact with a lower surface of the support 630, so that the upper side of the temperature fuse 500 may be supported by the support 630. As a result, the support 630 protruding from the second housing 600 may directly press the temperature fuse 500, and the temperature fuse 500 may be pressurized while being in contact with the cover plate 200 and thereby closely adhere to the cover plate 200.

Accordingly, in the coolant heater according to the present invention, the heat generated from the heating element 300 is quickly transferred through the cover plate 200 to the temperature fuse 500, thereby improving the overheat sensing responsiveness of the heating element through the temperature fuse 500 and preventing the heating element from being overheated. In addition, since the support 630 integrally formed with the second housing 600 is structured to fix the temperature fuse 500 by pressing the temperature fuse 500, no separate component for fixing the temperature fuse 500 is required, thereby reducing failure factors in a portion in which the temperature fuse is coupled and as a result improving durability and safety.

The support 630 of the second housing 600 may include a guide 631 extending downwardly from a lower end thereof, and an upper portion of the temperature fuse 500 may partially be inserted into an inner side surrounded by the guide 631.

That is, the guide 631 may protrude downwardly from the lower end of the support 630 that protrudes downwardly from the lower surface of the second housing 600 as illustrated, or a groove is formed to be concave upwardly from the lower surface of the support 630 and a portion surrounding the groove may be formed as a guide 631. The upper portion of the temperature fuse 500 may partially be inserted into the inner side surrounded by the guide 631, and the upper surface of the temperature fuse 500 may be in contact with the lower surface of the support 630. At this point, the guide 631 may be formed in such a manner that a low end of the inner side, into which the temperature fuse 500 is inserted, is inclined inwardly in an upward direction, thereby making it easy to insert the temperature fuse 500 into the inner side of the guide 631. As a result, the temperature fuse 500 may be exactly supported by the support 630, so that the temperature fuse 500 may closely adhere to the cover plate 200.

The controller 400 may include a through hole 410 penetrating in a vertical direction at a center portion thereof, and the temperature fuse 500 may be disposed in a region in which the through hole 410 is formed.

That is, referring to FIGS. 3 to 5, the temperature fuse 500 should be disposed at the center portion in width and length directions, so that the temperature fuse 500 may appropriately be pressed by the second housing 600 based on its own elasticity. In order to dispose the temperature fuse 500 at the center portion, the through hole 410 is formed in the center portion of the controller 400, which is disposed on a plane in parallel in the width direction and in the length direction, to penetrate in the vertical direction, thereby making it easy to arrange the controller 400 and the temperature fuse 500. At this point, the through hole 410 formed in the controller 400 may be formed in such a proper size and shape as to be spaced apart from the temperature fuse 500 in the width direction and in the length direction.

Also, an area of the through hole 410 may be larger than a cross-sectional area of the support 630 of the second housing 600 when cut horizontally.

This is to prevent the support 630 from being caught by the controller 400 when the support 630 presses the temperature fuse 500, so that the temperature fuse 500 may be exactly pressed by the support 630. By forming the through hole 410 to have an area larger than the cross-sectional area of the support 630 when cut horizontally, the support 630 may be disposed into the region of the through hole 410 when viewed from above.

Also, the second housing 600 may include a plurality of reinforcing ribs 640 protruding from a surface thereof.

As illustrated as an example, the reinforcing ribs 640 may protrude outwardly from an outer surface of the second housing 600. The plurality of reinforcing ribs 640 may be formed in a lattice form, with the plurality of reinforcing ribs formed in the length direction being spaced apart in parallel from each other in the width direction, and the plurality of reinforcing ribs formed in the width direction being spaced apart in parallel from each other in the length direction. As a result, when the support 630 presses the temperature fuse 500, it is possible to prevent the second housing 600 from being deformed or damaged in the portion in which the support 630 is formed, and accordingly, the temperature fuse 500 can be pressed by the support 630 in a more exact manner.

The cover plate 200 may include a seating groove 220 formed to be concave downwardly from the upper surface thereof, and a lower portion of the temperature fuse 500 may partially be inserted into the seating groove 220.

That is, by forming the seating groove 220 in the cover plate 200 to be concave downwardly from the upper surface thereof, the lower portion of the temperature fuse 500 may partially be inserted into the seating groove 220 to be coupled thereto. At this point, the seating groove 220 may be formed to be concave downwardly from the upper surface of the cover plate 200 by pressing the cover plate 200 that is a flat plate, thereby making it easy to fix the position of the temperature fuse 500 and increasing a contact area between the temperature fuse 500 and the cover plate 200.

The heating element 300 may be fixed to the cover plate 200 by welding a part of a heating section thereto.

That is, the heating element 300 may be fixed to the lower surface of the cover plate 200 by welding an upper central portion of the coil-like wound heating section thereto, and a welded portion 310 may be formed by welding a part of the heating element 300 to the cover plate 200 at a position under the temperature fuse 500. At this point, the cover plate 200 may include a protrusion 210 formed to be convex downwardly from the lower surface of the cover plate 200 at a portion at which the seating groove 220 is formed. The heating element 300 may be welded and fixed to the protrusion 210, and the remaining lower surface of the cover plate 200 excluding the protrusion 210 may be spaced apart from the heating element 300. As a result, a contact area between the heating element 300 and the cover plate 200 can be relatively increased and a contact resistance can be reduced, and accordingly, heat transfer can be smoothly performed. In the portion where the temperature fuse 500 is disposed, the heat may be quickly transferred between the heating element 300, the cover plate 200, and the temperature fuse 500, thereby improving the overheat sensing responsiveness of the heater.

FIGS. 6 to 9 are an assembled perspective view, an exploded perspective view, a front cross-sectional view, and a side cross-sectional view illustrating a coolant heater according to a second exemplary embodiment of the present invention.

As illustrated therein, a coolant heater 1000 according to the second exemplary embodiment of the present invention may include: a first housing 100 formed in a concave container shape, with an upper side thereof being open, and including an inlet 110 for introducing a coolant and an outlet 120 for discharging the coolant; a cover plate 200 coupled to cover and close the open upper side of the first housing 100; a heating element 300 provided in an internal space formed by coupling the first housing 100 and the cover plate 200; a controller 400 disposed above the cover plate 200 to be spaced apart therefrom, and connected to the heating element 300; a temperature fuse 500 disposed on the cover plate 200 and electrically connected to the controller 400, with a lower surface thereof being in contact with the cover plate 200; a second housing 600 formed in the concave container shape, with a lower side thereof being open, and coupled to an upper end portion of the first housing 100 to cover and encase the controller 400 and the temperature fuse 500; and an elastic means 800 interposed between the temperature fuse 500 and the second housing 600, with a lower end thereof being supported by the temperature fuse 500 and an upper end thereof being supported by the second housing 600.

The first housing 100 may be disposed in the shape of the container that is concave downwardly with its open side facing upwardly. The inlet 110 for introducing the coolant may be formed at one side of the first housing 100 in a length direction, and the outlet 120 for discharging the coolant may be formed at the other side of the first housing 100 in the length direction. The first housing 100 may be formed of a metal material as an example, or may be formed of another material or shape in various manners.

The cover plate 200 may be coupled to the first housing 100 to cover and close the open upper side of the first housing 100, and the open upper side of the first housing 100 may be sealed by the cover plate 200. A first space A1, which is the internal space formed by coupling the first housing 100 and the cover plate 200, is a coolant flow path for the coolant to flow therein. When the coolant is introduced into an inlet pipe, which is the inlet 110, the coolant may pass through the first space A1 of the first housing 100 and may be discharged through an outlet pipe, which is the outlet 120. The cover plate 200 may be formed as a flat plate of a metal material, or may be formed of another material or shape in various manners.

The heating element 300 may be a heating element capable of generating heat in various types and shapes. As an example, a sheath heater may be used. The sheath heater is an electric heater capable of heat generation based on electric resistance caused by an electric heating wire that is embedded in a protective tube, and a tubular heater in which the electric heating wire is embedded in a coil shape in a metallic protective tube and an insulating magnesium oxide powder is filled therein to insulate the electric heating wire and the protective tube. The sheath heater may be formed in a coil type by winding a long tubular heater several times, or may be formed in another shape in various manners. The heating element 300 may be disposed under the cover plate 200 and provided in the first housing 100, and both ends of the heating element 300 in the length direction may be coupled and fixed to the cover plate 200. Also, both the ends of the heating element 300 in the length direction may penetrate through the cover plate 200 and protrude upwardly further than an upper surface of the cover plate 200, and both the ends of the heating element 300 may be formed in a linear shape upwardly from ends of both coil-like wounded portions and the linear sections may be coupled to penetrate through the cover plate 200. At this point, the linear sections of the heating element 300 penetrating through the cover plate 200 may be coupled to the cover plate 200 by welding or the like and the connection section may be sealed, or a sealing material may be used to seal a potion in which the heating element 300 penetrates through the cover plate 200.

The controller 400, which serves to control the operation of the heating element 300, may be disposed above the cover plate 200 in parallel to be spaced from each other. The controller 400 may be coupled and fixed to supports protruding upwardly from the cover plate 200 by using fastening means or the like. Both the ends of the heating element 300, which have penetrated through the cover plate 200 and protrude above the cover plate 200, may be coupled to the controller 400 and electrically connected thereto.

The temperature fuse 500 may be formed of a bimetal or the like that is capable of blocking the current flowing when the temperature exceeds a specific value to stop the operation of the controller 400, and the temperature fuse 500 may be attached to be electrically connected to the controller 400 and to be in contact with the cover plate 200. At this point, the temperature fuse 500 may be disposed on the center of the cover plate 200 in a width direction and in a length direction, and the temperature fuse 500 may partially be inserted into a seating groove 220 formed to be concave downwardly from the upper surface of the cover plate 200, and the temperature fuse 500 may be disposed to be in contact with the upper surface of the cover plate 200.

The second housing 600 may be formed of a plastic material as an example, and may be formed in the shape of the container that is concave upwardly, with its open side facing downward. Further, the second housing 600 may be coupled to the upper end portion of the first housing 100. As an example, the upper end portion of the first housing 100 may be disposed to be in contact with an lower end portion of the second housing 600 so as to be coupled thereto. The first housing 100 may include a plurality of fastening holes which are spaced apart from each other along a periphery of the upper end portion thereof, and the second housing 600 may include through holes formed at positions corresponding to the plurality of fastening holes. The first housing 100 and the second housing 600 may be coupled by separate fastening means. A second space A2, which is an internal space formed by coupling the second housing 600 and the cover plate 200, may contain a controller 400 and a temperature fuse 500 therein. At this point, a sealing member 700 formed of an elastic material such as rubber may be fitted around a peripheral portion of the cover plate 200 to cover an entire edge of the cover plate 200. In the state in which the sealing member 700 is coupled to the cover plate 200, the peripheral portion of the cover plate 200 including the sealing member 700 is interposed between the upper end portion of the first housing 100 and the lower end portion of the second housing 600 to closely adhere thereto. As a result, the first space A1 and the second space A2 can be sealed by the sealing member 700 so as not to communicate with each other. In addition, the second housing 600 may include a high voltage connector 620 electrically connected to the controller 400.

The elastic means 800 may be interposed between the temperature fuse 500 and the second housing 600. As an example, the elastic means 800 may be formed as a compression coil spring, and may be in a compressed state with the lower end thereof being supported by the upper surface of the temperature fuse 500 and the upper end thereof being supported by the lower surface of the second housing 600. As a result, the temperature fuse 500 may be pressed downwardly in a height direction by the elastic means 800 and may closely adhere to the cover plate 200. At this point, the elastic means 800 may be formed in various shapes, besides the compression coil spring, to press the temperature fuse 500 such that the temperature fuse 500 may closely adhere to the cover plate 200.

Accordingly, in the coolant heater according to the present invention, the heat generated from the heating element 300 is quickly transferred through the cover plate 200 to the temperature fuse 500, thereby improving the overheat sensing responsiveness of the heating element through the temperature fuse 500 and preventing the heating element from being overheated. In addition, the elastic means 800 elastically supported by being interposed between the second housing 600 and the temperature fuse 500 makes it possible to closely adhere the temperature fuse 500 to the cover plate 200 with an appropriate force, and an excessive force is not applied to the temperature fuse 500, the second housing 600, and the cover plate 200, thereby preventing the components from being deformed or damaged and as a result improving durability and safety. In addition, the elastic means may absorb a dimensional tolerance between the components to be assembled and coupled and an assembly tolerance between the components, thereby making it possible to facilitate assembling.

In addition, the coolant heater 1000 according to the second exemplary embodiment of the present invention may further include a cover 900 coupled and fixed to the second housing 600. As illustrated as an example, the cover 900 may be formed such that a center portion thereof is concave downwardly when viewed in the length direction, and both sides thereof in the width direction may be coupled and fixed to the second housing 600 by separate fastening means or the like. The cover may include an opening 910 formed in the center portion thereof to penetrate through upper and lower surfaces thereof in the height direction. As an example, the temperature fuse 500 may include connection tabs 520 protruding respectively from both lateral surfaces of a body 510 in the length direction, and the connection tabs 520 may be disposed between the lower surface of the second housing 600 and an upper surface of the cover 900. The body 510 may be disposed such that a lower portion thereof is inserted into the opening 910 of the cover 900. At this point, the connection tabs 520 may be parts for electrically connecting the temperature fuse 500 to the heating element 300, the controller 400, or the high voltage connector 620.

Thus, the connection tabs 520 protruding from the body 510 of the temperature fuse 500 may be caught by the cover 900, thereby preventing the temperature fuse 500 from entirely escaping out below the cover 900, and allowing only a part of the temperature fuse 500 to protrude downwardly further than a lower surface of the cover 900. By placing the elastic means 800 and the temperature fuse 500 between the second housing 600 and the cover 900 and coupling and fixing the cover 900 to the second housing 600, it is easy to form the second housing 600, the elastic means 800, the temperature fuse 500, and the cover 900 in an integrally assembled form.

In addition, the second housing 600 may include a seating section 650 protruding from the lower surface thereof, and the elastic means 800 may be inserted into an inner space of the seating section 650 to be seated therein.

That is, the seating section 650 may protrude downwardly from the lower surface of the second housing 600 at a position corresponding to the position of the temperature fuse 500 as illustrated. As an example, the seating section 650 may be formed in a cylindrical shape. By inserting the elastic means 800 into the inner space of the seating section 650, the elastic means 800 may be prevented from being separated apart or being deformed in the width direction or in the length direction. At this point, the seating section 650 is shorter in the height direction than the elastic means 800, and the lower end of the elastic means 800 is positioned below a lower end of the seating section 650, thereby securing a space in which the elastic means 800 can be compressed.

Figure 10:
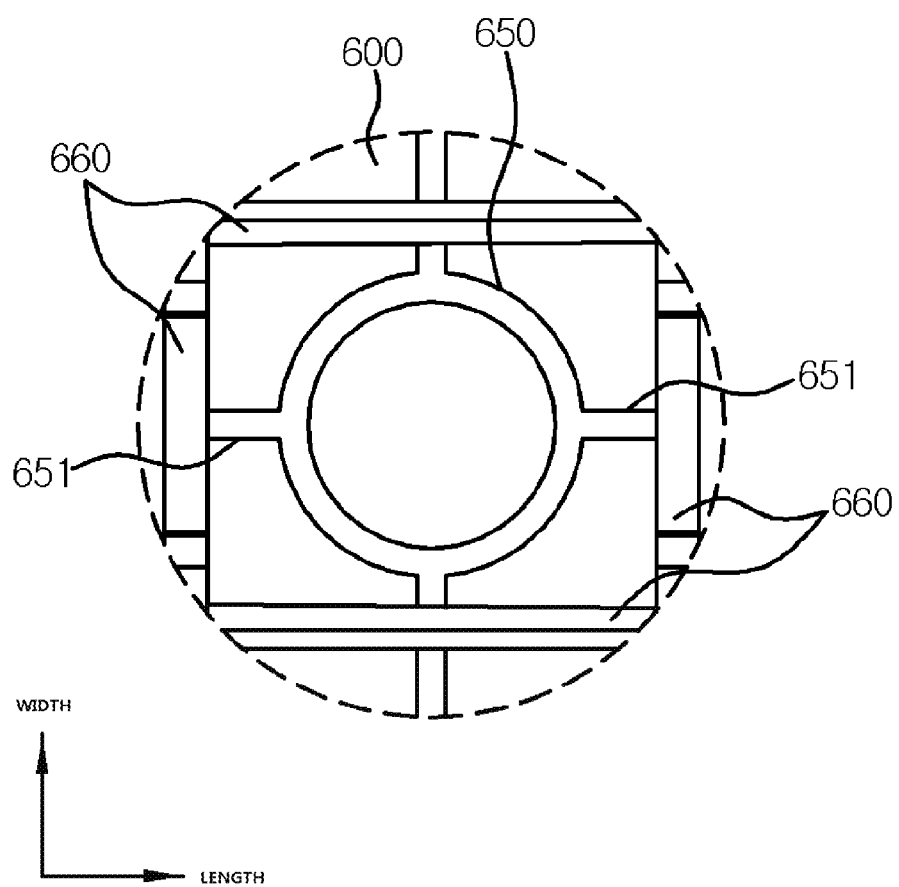
FIG. 10 is a partial plan view of a portion in which a seating section of a second housing is formed, when viewed from below, in the coolant heater according to the second exemplary embodiment of the present invention.
Figure 11:
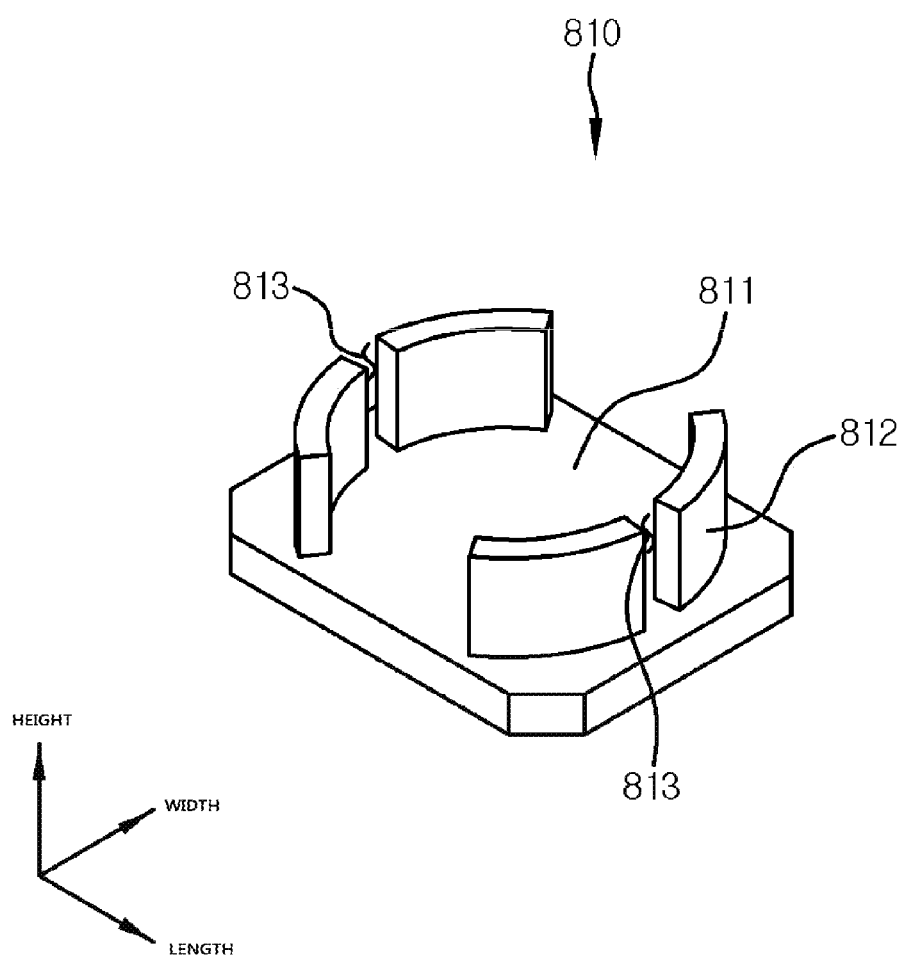
FIG. 11 is a perspective view illustrating a push plate of the coolant heater according to the second exemplary embodiment of the present invention.
Figure 12:
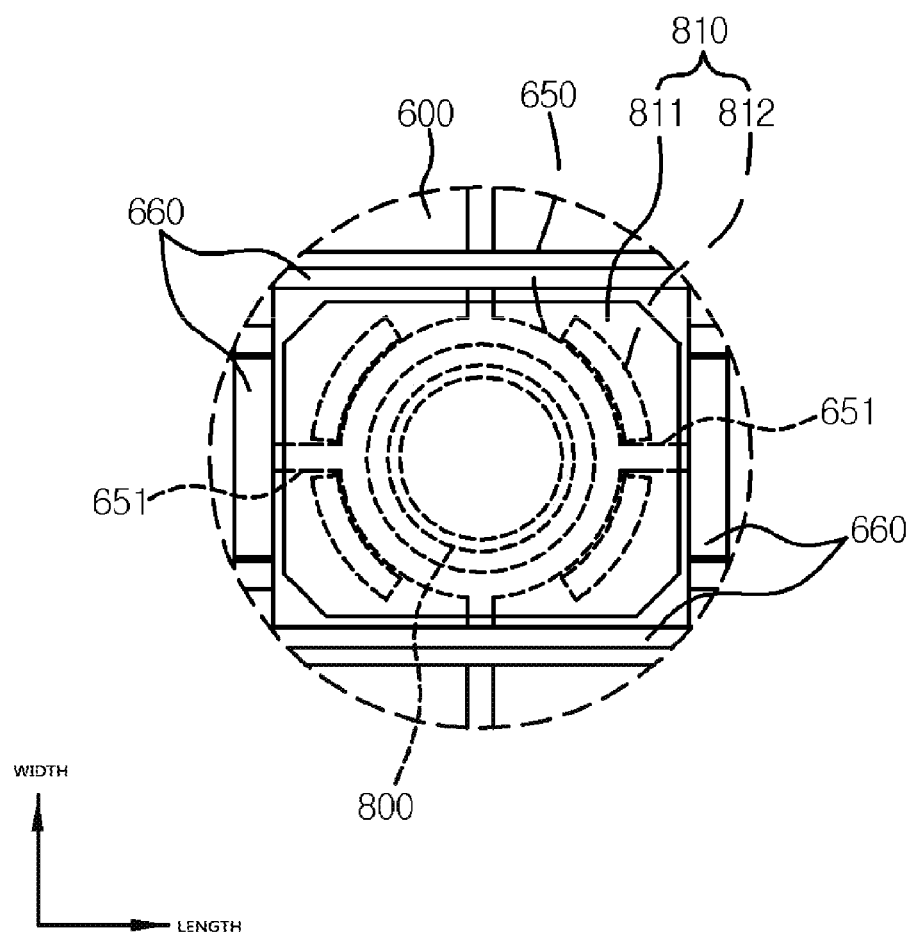
FIG. 12 is a partial plan view illustrating a state in which the push plate is coupled in the portion in which the seating section of the second housing is formed in the coolant heater according to the second exemplary embodiment of the present invention.

FIG. 10 is a partial plan view of a portion in which the seating section of the second housing is formed, when viewed from below, in the coolant heater according to the second exemplary embodiment of the present invention, FIG. 11 is a perspective view illustrating a push plate of the coolant heater according to the second exemplary embodiment of the present invention, and FIG. 12 is a partial plan view illustrating a state in which the push plate is coupled in the portion in which the seating section of the second housing is formed in the coolant heater according to the second exemplary embodiment of the present invention.

As illustrated therein, the coolant heater 1000 according to the second exemplary embodiment of the present invention may further include a push plate 810. The push plate 810 may include: a support plate 811 disposed between the temperature fuse 500 and the elastic means 800, with an upper surface thereof being in contact with the elastic means 800 and a lower surface thereof being in contact with the temperature fuse 500; and a first guide 812 protruding upwardly from the support plate 811 and fitted around an outer surface of the seating section 650.

That is, by interposing the support plate 811 of the push plate 810 between the temperature fuse 500 and the elastic means 800, the elastic means 800 presses the push plate 810 downwardly, and the temperature fuse 500 is pushed downwardly by the push plate 810 and thereby closely adheres to the cover plate 200. At this point, the push plate 810 may include a first guide 812 protruding upwardly from the upper surface thereof, and the first guide 812 may be fitted around the outer surface of the seating section 650 with a clearance. When the push plate 810 moves in the vertical direction, the movement is guided by the first guide 812 and the push plate 810 may slidingly move in the vertical direction in a smooth way in a state in which the support plate 811 is kept in a horizontal position. Since the support plate 811 formed as a flat plate pushes the temperature fuse 500 downward, the temperature fuse 500 can be exactly pushed downward in the height direction, while not being tilted. Here, the first guide 812 of the push plate 810 may be formed to correspond to the seating section 650. When the seating section 650 is cylindrical as an example, the overall shape of the first guide 812 may be cylindrical with an inner diameter thereof being larger than an outer diameter of the seating section 650.

The first guide 812 of the push plate 810 may include a slit 813 penetrating through an inner surface and an outer surface thereof in the width direction or in the length direction.

That is, as illustrated, the overall shape of the first guide 812 may be cylindrical, and the first guide 812 may include slits 813 penetrating through the inner surface and the outer surface thereof in the width direction or in the length direction. As an example, the slit 813 may be formed in the height direction continuously from an upper end to a lower end of the first guide 812. When the push plate 810 moves in the vertical direction in a state in which the first guide 812 of the push plate 810 is fitted around the outer surface of the seating section 650, the slit 813 makes it possible to keep the inner space of the seating section 650 and the outside in communication with each other, so that air may be introduced and discharged into/from the inner space of the seating section 650 in a smooth way and the push plate 810 may move smoothly in the vertical direction.

In addition, a rotation preventing protrusion 651 may protrude from an outer circumferential surface of the seating section 650, and the rotation preventing protrusion 651 may be inserted into the slit 813 of the push plate 810 to be coupled thereto.

Here, when the elastic means 800 formed in a coil spring type is compressed or stretched, torsion may occur in the elastic means 800 and accordingly the push plate 810, which closely adheres to the elastic means 800, may possibly be rotated. As a result, the temperature fuse 500, which is assembled to closely adhere to the push plate 810, may be rotated and may not adhere to the cover plate 200 in an exact position, or the lower end of the temperature fuse 500 may not be inserted into the seating groove 220 formed in the cover plate 200. By inserting the rotation preventing protrusion 651 into the slit 813, the push plate 810 is prevented by the rotation preventing protrusion 651 from rotating about an axis in the height direction. At this point, the rotation preventing protrusion 651 may be formed radially on the outer circumferential surface of the seating section 650, and the rotation preventing protrusions 651 may be formed in a plural number.

In addition, the second housing 600 may include a second guide 660 protruding from the lower surface thereof, and the push plate 810 may be disposed in an inner space surrounded by the second guide 660.

That is, since the second guide 660 protrudes from the lower surface of the second housing 600, and the push plate 810 is disposed in the inner space surrounded by the second guide 660, the push plate 810 may move only in the height direction without being separated out in the width direction and in the length direction.

The support plate 811 of the push plate 810 may be formed in a polygonal shape when viewed in the height direction, and the second guide 660 of the second housing 600 may be formed to correspond in shape to the support plate 811.

By forming the support plate 811 of the push plate 810 in a polygonal shape and forming the second guide 660, which surrounds the support plate 811, to correspond in shape to the support plate 811, the push plate 810 may be prevented from being rotated about the axis in the height direction. As illustrated as an example, the support plate 811 may be formed to be tetragonal when viewed in the height direction.

Figure 13:
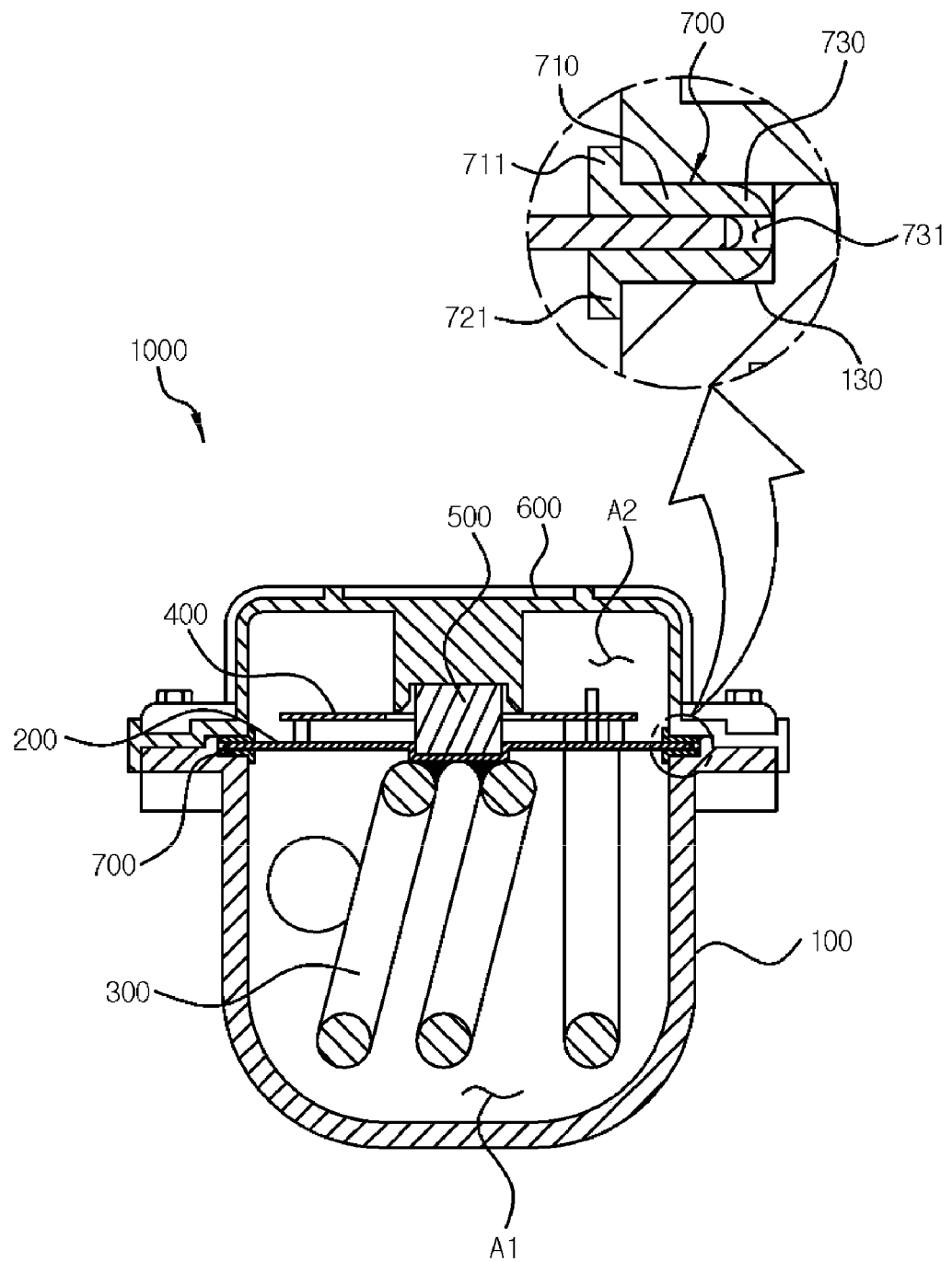
FIG. 13 is a side cross-sectional view illustrating an internal structure of the coolant heater and a sealing member according to the present invention.
Figure 14:
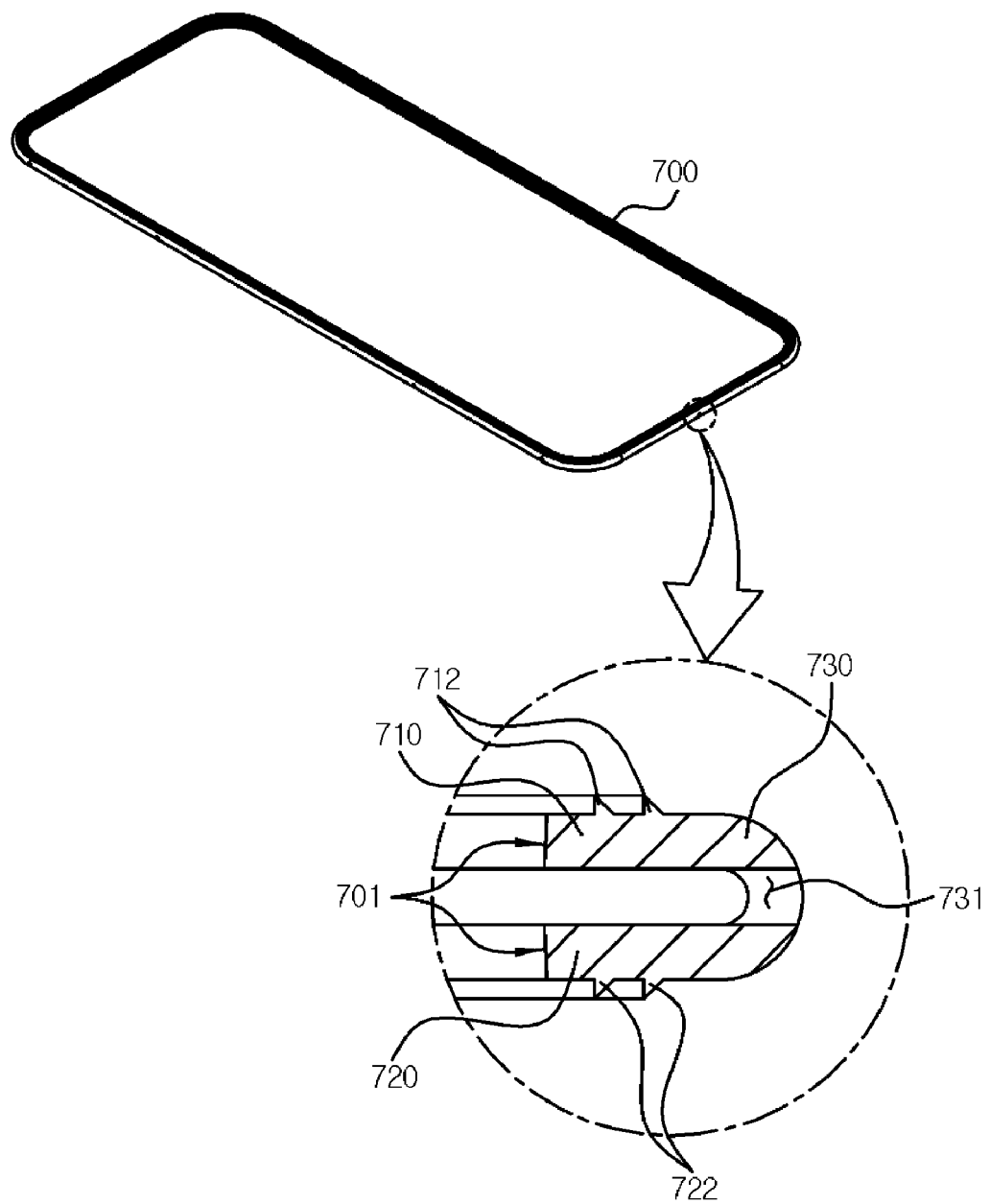
FIG. 14 is a perspective view of the sealing member according to the present invention.

FIGS. 13 and 14 are a side cross-sectional view illustrating an internal structure of the coolant heater and the sealing member according to the present invention and a perspective view of the sealing member.

As illustrated therein, the coolant heater 1000 according to the present invention includes: a first housing 100 formed in a concave container shape, with an upper side thereof being open, and including an inlet 110 for introducing a coolant and an outlet 120 for discharging the coolant; a cover plate 200 coupled to cover and close the open upper side of the first housing 100; a heating element 300 provided in an internal space formed by coupling the first housing 100 and the cover plate 200; a second housing 600 formed in the concave container shape, with a lower side thereof being open, and coupled to an upper end portion of the first housing 100; and a sealing member 700 fitted around a peripheral portion of the cover plate 200 to cover an entire edge of the cover plate 200, and formed to cover all three surfaces at the peripheral portion of the cover plate 200. In the state in which the sealing member 700 is fitted around the peripheral portion of the cover plate 200, the peripheral portion of the cover plate 200 including the sealing member 700 is interposed between an upper end portion of the first housing 100 and a lower end portion of the second housing 600 to closely adhere thereto.

The first housing 100 may be disposed in the shape of the container that is concave downwardly, with its open side facing upwardly. The inlet 110 for introducing the coolant may be formed at one side of the first housing 100 in a length direction, and the outlet 120 for discharging the coolant may be formed at the other side of the first housing 100 in the length direction. The first housing 100 may be formed of a metal material as an example, or may be formed of another material or shape in various manners.

The cover plate 200 may be coupled to the first housing 100 to cover and close the open upper side of the first housing 100, and the open upper side of the first housing 100 may be sealed by the cover plate 200. A first space A1, which is the internal space formed by coupling the first housing 100 and the cover plate 200, is a coolant flow path for the coolant to flow therein. When the coolant is introduced into an inlet pipe, which is the inlet 110, the coolant may pass through the first space A1 of the first housing 100 and may be discharged through an outlet pipe, which is the outlet 120. The cover plate 200 may be formed as a flat plate of a metal material, or may be formed of another material or shape in various manners.

The heating element 300 may be a heating element capable of generating heat in various types and shapes. As an example, a sheath heater may be used. The sheath heater is an electric heater capable of heat generation based on electric resistance caused by an electric heating wire that is embedded in a protective tube, and a tubular heater in which the electric heating wire is embedded in a coil shape in a metallic protective tube and an insulating magnesium oxide powder is filled therein to insulate the electric heating wire and the protective tube. The sheath heater may be formed in a coil type by winding a long tubular heater several times, or may be formed in another shape in various manners. The heating element 300 may be disposed under the cover plate 200 and provided in the first housing 100, and both ends of the heating element 300 in the length direction may be coupled and fixed to the cover plate 200. Also, both the ends of the heating element 300 in the length direction may penetrate through the cover plate 200 and protrude upwardly further than an upper surface of the cover plate 200, and both the ends of the heating element 300 may be formed in a linear shape upwardly from ends of both coil-like wounded portions and the linear sections may be coupled to penetrate through the cover plate 200. At this point, the linear sections of the heating element 300 penetrating through the cover plate 200 may be coupled to the cover plate 200 by welding or the like and the connection section may be sealed, or a sealing material may be used to seal a potion in which the heating element 300 penetrates through the cover plate 200.

The second housing 600 may be formed of a plastic material as an example, and may be formed in the shape of the container that is concave upwardly, with its open side facing downward. Further, the second housing 600 may be coupled to the upper end portion of the first housing 100. As an example, the upper end portion of the first housing 100 may be disposed to be in contact with an lower end portion of the second housing 600 so as to be coupled thereto. The first housing 100 may include a plurality of fastening holes which are spaced apart from each other along a periphery of the upper end portion thereof, and the second housing 600 may include through holes formed at positions corresponding to the plurality of fastening holes. The first housing 100 and the second housing 600 may be coupled by separate fastening means. A second space A2, which is an internal space formed by coupling the second housing 600 and the cover plate 200, may contain a controller 400, a temperature fuse 500, and the like therein. The controller 400, which serves to control the operation of the heating element 300, may be disposed above the cover plate 200 in parallel to be spaced from each other. The controller 400 may be coupled and fixed to supports protruding upwardly from the cover plate 200 by using fastening means or the like. Both the ends of the heating element 300, which have penetrated through the cover plate 200 and protrude above the cover plate 200, may be coupled to the controller 400 and electrically connected thereto. The temperature fuse 500 may be formed of a bimetal or the like that is capable of blocking the current flowing when the temperature exceeds a specific value to stop the operation of the controller 400, and the temperature fuse 500 may be coupled to be electrically connected to the controller 400 and to be in contact with the cover plate 200. At this point, the temperature fuse 500 may partially be inserted into a seating groove 220 formed to be concave downwardly from the upper surface of the cover plate 200, so that the temperature fuse 500 is disposed to be in contact with the upper surface of the cover plate 200. As illustrated, the second housing 600 may also include a low voltage connector 610 and a high voltage connector 620, and the connectors 610 and 620 may be electrically connected to the controller 400.

Here, the sealing member 700 may be fitted around the peripheral portion of the cover plate 200 to cover the entire edge of the cover plate 200. In the state where the sealing member 700 is coupled to the cover plate 200, the peripheral portion of the cover plate 200 including the sealing member 700 may be interposed between the upper end portion of the first housing 100 and the lower end portion of the second housing 600 to closely adhere thereto. That is, since the peripheral portion of the cover plate 200, to which the sealing member 700 is coupled, is interposed between the surfaces of the first housing 100 and the second housing 600 coupled to each other, the sealing member 700 may be pressed and thus the contact surfaces may be coupled to closely adhere to each other. At this point, the sealing member 700 may be formed to cover all three surfaces, i.e. an upper surface, a lateral side surface, and a lower surface, at the peripheral portion of the cover plate 200. Thus, sealing can be provided by the sealing member 700 between the first housing 100 and the cover plate 200, and the first space A1, which is a coolant flow path, can be sealed. Also, sealing can be provided by the sealing member 700 between the cover plate 200 and the second housing 600, and the second space (A1), which contains the controller 400 and the temperature fuse 500 therein, can be sealed.

Referring to FIG. 14, the sealing member 700 may be formed to be rectangular such that the overall shape of the sealing member 700 corresponds to the outer shape of the cover plate 200. The sealing member 700 may have a "⊃"-shaped cross section, when partially cut, in such a manner that an upper sealing portion 710 is spaced apart from a lower sealing portion 720 in a vertical direction, and one end of the upper sealing portion 710 is connected to one end of the lower sealing portion 720 by an arc-shaped connection portion 730. Thus, the sealing member 700 may be coupled to the cover plate 200 in such a manner that the peripheral portion of the cover plate 200 is inserted into a concave groove formed in the sealing member 700. Further, the sealing member 700 may be formed of an elastic rubber material or the like, and may be formed of another material or shape in various manners.

Accordingly, in the coolant heater according to the present invention, a sealing force can be improved by the sealing member at a portion in which the members coupled to form a coolant flow path are in contact with each other, thereby preventing the coolant from being leaked to the outside of the housing, and a space containing the controller, the temperature fuse, and the like therein can also be sealed, thereby preventing penetration of water into the space. Also, the first housing and the cover plate may not be in contact with each other and may be separated from each other by the sealing member. When the first housing and the cover plate are formed from different types of metal materials, corrosion caused by a potential difference of the different materials can be prevented, and as a result air tightness can be improved.

Figure 15:
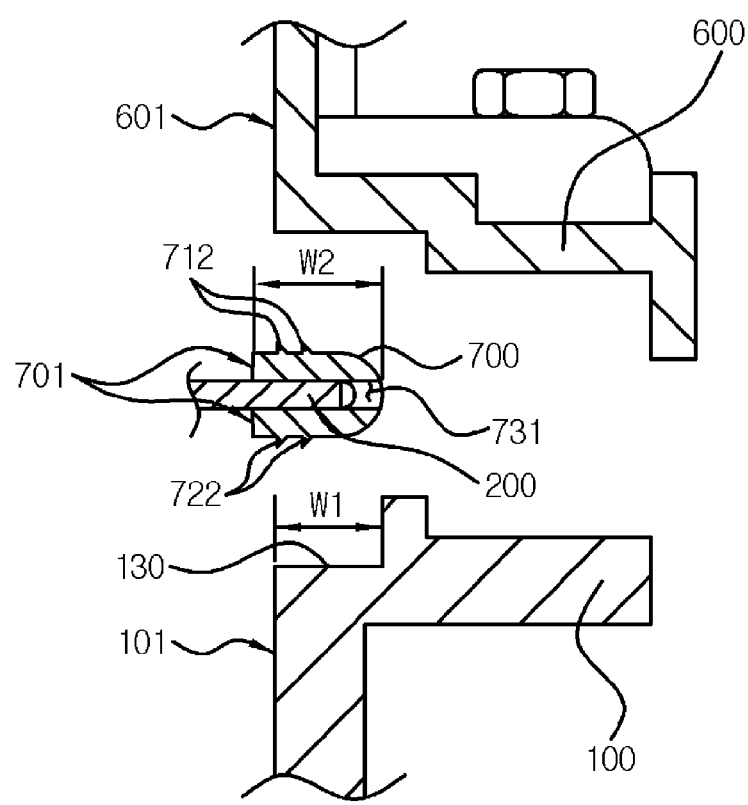
FIG. 15 is a partial exploded cross-sectional view illustrating a portion sealed by the sealing member of the coolant heater according to the present invention.
Figure 16:
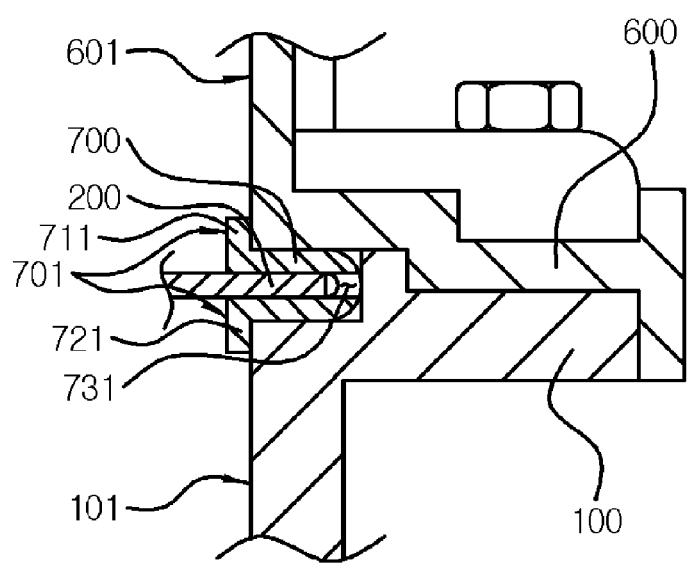
FIG. 16 is a partial assembled cross-sectional view illustrating a portion sealed by the sealing member of the coolant heater according to the present invention.

FIGS. 15 and 16 are a partial exploded cross-sectional view and a partial assembled cross-sectional view illustrating a portion sealed by the sealing member of the coolant heater according to the present invention.

As illustrated therein, inner ends 701 of the sealing member 700 may be formed to protrude inwardly further than inner wall surfaces 101 and 601 of the first housing 100 and the second housing 600.

That is, in the state in which the sealing member 700 is fitted around the peripheral portion of the cover plate 200, when the peripheral portion of the cover plate 200 including the sealing member 700 is interposed between the upper end portion of the first housing 100 and the lower end portion of the second housing 600 to closely adhere thereto, the inner ends 701, which are left lateral surfaces of the upper sealing portion 710 and the lower sealing portion 720 of the sealing member 700, may protrude inwardly further than the inner wall surface 101 of the lateral wall of the first housing 100 and the inner wall surface 601 of the lateral wall of the second housing 600. When the sealing member 700 is pressed by coupling the first housing 100 and the second housing 600, the first housing 100 may not be in direct contact with the cover plate 200, and the second housing 600 may also not be in direct contact with the cover plate 200. In addition, as illustrated, the sealing member 700 may be pressed by the first housing 100 and the second housing 600 and overlap portions 711 and 721 may be formed. The overlap portions 711 and 721 of the sealing member 700 may be in contact with the inner wall surface 101 of the lateral wall of the first housing 100, and the inner wall surface 601 of the lateral wall of the second housing 600, thereby further improving a sealing force.

The sealing member 700 may include a through hole 731 penetrating through both surfaces thereof so that an inner space into which the cover plate 200 is inserted and the outside may communicate with each other.

For example, when a through-hole is not formed in the sealing member, in the state in which the sealing member 700 is fitted around the peripheral portion of the cover plate 200, and in the state in which the peripheral portion of the cover plate 200 including the sealing member 700 is interposed between the upper end portion of the first housing 100 and the lower end portion of the second housing 600 to closely adhere thereto, the coolant may possibly flow into the second space A2 through a space between contact surfaces of the cover plate 200 and the sealing member 700 due to a high pressure of the first space A1 in which the coolant flows.

When the through hole 731 penetrating through an inner surface and an outer surface of the sealing member 700 is formed as in the present invention, even if the coolant is leaked minutely through the space between the contact surfaces of the cover plate 200 and the sealing member 700 due to a high pressure of the first space A1 in which the coolant flows, the coolant does not flow into the second space A2 and may be discharged to the outside of the housing by flowing through a minute gap between the contact surfaces of the first housing 100 and the second housing 600 into the atmosphere that has a relatively lower pressure than the second space A2.

Accordingly, damages to the controller 400, the temperature fuse 500, and the like, which may be contained in the second space A2, can be prevented.

At this point, the through hole 731 may be formed from the inner surface of the sealing member 700, which faces a lateral surface of the cover plate 200, in a horizontal direction.

That is, the through hole 731 may be formed in the connection portion 730 connecting the upper sealing portion 710 and the lower sealing portion 720. As an example, the through hole 731 may be formed at a portion facing the lateral surface of the cover plate 200 to penetrate through the inner surface and the outer surface of the connection portion 730. Further, a plurality of through holes 731 may be formed to be spaced apart from one another along the contour of the sealing member 700.

In addition, the first housing 100 may include a sealing member seating groove 130 formed to be concave downwardly from an upper surface of the upper end portion thereof, and the sealing member 700 may be inserted into the sealing member seating groove 130.

As illustrated, the sealing member seating groove 130 is formed in the upper end portion of the first housing 100 in such a manner that an inner side edge of the upper end portion of the first housing 100 is concave. The peripheral portion of the cover plate 200 including the sealing member 700 may be inserted into the sealing member seating groove 130.

At this point, a width W2 of the sealing member 700 may be larger than a width W1 of the sealing member seating groove 130, thereby making it possible to enable the cover plate 200 not to be in contact with the first housing 100 and the second housing 600, and the overlap portions 711 and 721 may be formed when the sealing member 700 is pressed, thereby improving a sealing force.

In addition, the sealing member 700 may include rugged protrusions 712 and 722 formed at an upper outer surface and a lower outer surface thereof, respectively.

As illustrated, in the state in which the sealing member 700 is not pressed, the protrusions 712 may protrude upwardly from the upper surface of the upper sealing portion 710 and the protrusions 722 may protrude downwardly from the lower surface of the lower sealing portion 720. When the sealing member 700 is coupled between the first housing 100 and the second housing 600 to be pressed in a state in which the sealing member 700 is fitted around the cover plate 200, the protrusions 712 and 722 of the sealing member 700 are completely pressed and compressed, and the sealing member may closely adhere to the first housing 100 and the second housing 600 so that the protrusions 712 and 722 disappear, thereby making it possible to increase a sealing force at a portion at which the protrusions are present and as a result improving air tightness.

The present invention is not limited to the abovementioned exemplary embodiments, but may be variously applied. In addition, the present invention may be variously modified by those skilled in the art to which the present invention pertains without departing from the gist of the present invention claimed in the claims.

DESCRIPTION OF REFERENCE NUMERALS

1000: coolant heater
100: first housing
101: inner wall surface
110: inlet
120: outlet
130: sealing member seating groove
200: cover plate
210: protrusion
220: seating groove
300: heating element
310: welded portion
400: controller
410: through hole
500: temperature fuse
510: body
520: connection tab
600: second housing
601: inner wall surface
610: low voltage connector
620: high voltage connector
630: support
631: guide
640: reinforcing rib
650: seating section
651: rotation preventing protrusion
660: second guide
700: sealing member
701: inner end
710: upper sealing portion
711: overlap portion
712: protrusion
720: lower sealing portion
721: overlap portion
722: protrusion
730: connection portion
731: through hole
800: elastic means
810: push plate
811: support plate
812: first guide
813: slit
900: cover
910: opening
A1: first space
A2: second space
W1: width of sealing member seating groove
W2: width of sealing member.

The invention claimed is:

1. A coolant heater comprising:
a heating element for heating a coolant;
a first housing for accommodating the heating element;
a cover plate for sealing the first housing in which the heating element is accommodated;
a temperature fuse provided in an external space formed by coupling the first housing and the cover plate, and disposed to be adjacent to the cover plate;

a second housing for pressing the temperature fuse to be pressurized toward the cover plate);

an elastic means interposed between the temperature fuse and the second housing, with a lower end thereof being supported by the temperature fuse and an upper end thereof being supported by the second housing; and a cover coupled and fixed to the second housing, with an opening penetrating through upper and lower surfaces thereof, wherein a lower portion of a body of the temperature fuse is inserted into the opening of the cover, and the temperature fuse includes connection tabs protruding from an upper portion of the body towards both sides in a width direction or in a length direction, the connection tabs being disposed between a lower surface of the second housing and an upper surface of the cover.

2. The coolant heater of claim 1, wherein the first housing is formed in a concave container shape, with an upper side thereof being open, and includes an inlet for introducing the coolant and an outlet for discharging the coolant, the cover plate is coupled to cover and close the open upper side of the first housing, and the second housing is formed in the concave container shape, with a lower side thereof being open, and coupled to an upper end portion of the first housing.

3. The coolant heater of claim 1, wherein the second housing includes a support protruding downwardly from a lower surface thereof at a position corresponding to the temperature fuse, and an upper surface of the temperature fuse is in contact with and supported by the support.

4. The coolant heater of claim 3, wherein the support of the second housing includes a guide extending downwardly from a lower end thereof, and an upper portion of the temperature fuse is partially inserted into an inner side surrounded by the guide.

5. The coolant heater of claim 1, wherein the second housing includes a plurality of reinforcing ribs protruding from a surface thereof.

6. The coolant heater of claim 1, wherein the cover plate includes a seating groove formed to be concave downwardly from an upper surface thereof, and a lower portion of the temperature fuse is partially inserted into the seating groove.

7. The coolant heater of claim 1, wherein the second housing includes a seating section protruding from a lower surface thereof, and the elastic means is inserted into an inner space of the seating section to be seated therein.

8. The coolant heater of claim 7, further comprising a push plate including: a support plate disposed between the temperature fuse and the elastic means, with an upper surface thereof being in contact with the elastic means and a lower surface thereof being in contact with the temperature fuse; and a first guide protruding upwardly from the support plate and fitted around an outer surface of the seating section.

9. The coolant heater of claim 8, wherein the first guide of the push plate includes a slit penetrating through an inner surface and an outer surface thereof in a width direction or in a length direction.

10. The coolant heater of claim 9, wherein the seating section includes a rotation preventing protrusion protruding from an outer circumferential surface thereof, the rotation preventing protrusion being inserted into the slit of the push plate to be coupled thereto.

11. The coolant heater of claim 8, wherein the second housing includes a second guide protruding from the lower surface thereof, and the push plate is disposed in an inner space surrounded by the second guide.

12. The coolant heater of claim 11, wherein the support plate of the push plate is formed in a polygonal shape when viewed in a height direction, and the second guide of the second housing is formed to correspond in shape to the support plate.

13. The coolant heater of claim 1, further comprising a sealing member fitted around a peripheral portion of the cover plate to cover an entire edge of the cover plate, and formed to cover all three surfaces at the peripheral portion of the cover plate, wherein, in a state in which the sealing member is fitted around the peripheral portion of the cover plate, the peripheral portion of the cover plate including the sealing member is interposed between an upper end portion of the first housing and a lower end portion of the second housing to closely adhere thereto.

14. The coolant heater of claim 13, wherein inner ends of the sealing member protrude inwardly further than inner wall surfaces of the first housing and the second housing to be coupled thereto.

15. The coolant heater of claim 13, wherein the sealing member includes a through hole penetrating through both surfaces thereof to enable communication between an inner space into which the cover plate is inserted and the outside.

16. The coolant heater of claim 13, wherein the first housing includes a sealing member seating formed to be concave downwardly from an upper surface of the upper end portion thereof, and the sealing member is inserted into the sealing member seating groove.

17. The coolant heater of claim 16, wherein a width of the sealing member is larger than a width of the sealing member seating groove.

18. The coolant heater of claim 13, wherein the sealing member includes protrusions formed in a rugged form at an upper outer surface and a lower outer surface thereof, respectively.

19. A coolant heater comprising:

a heating element for heating a coolant;

a first housing for accommodating the heating element;

a cover plate for sealing the first housing in which the heating element is accommodated;

a temperature fuse provided in an external space formed by coupling the first housing and the cover plate, and disposed to be adjacent to the cover plate;

a second housing for pressing the temperature fuse to be pressurized toward the cover plate;

an elastic means interposed between the temperature fuse and the second housing, with a lower end thereof being supported by the temperature fuse and an upper end thereof being supported by the second housing, wherein the second housing includes a seating section protruding from a lower surface thereof, and the elastic means is inserted into an inner space of the seating section to be seated therein; and a push plate including: a support plate disposed between the temperature fuse and the elastic means, with an upper surface thereof being in contact with the elastic means and a lower surface thereof being in contact with the temperature fuse; and a first guide protruding upwardly from the support plate and fitted around an outer surface of the seating section.

20. A coolant heater comprising:

a heating element for heating a coolant;

a first housing for accommodating the heating element;

a cover plate for sealing the first housing in which the heating element is accommodated;

a temperature fuse provided in an external space formed by coupling the first housing and the cover plate, and disposed to be adjacent to the cover plate;

a second housing for pressing the temperature fuse to be pressurized toward the cover plate; and a sealing member fitted around a peripheral portion of the cover plate to cover an entire edge of the cover plate, and formed to cover all three surfaces at the peripheral portion of the cover plate, wherein, in a state in which the sealing member is fitted around the peripheral portion of the cover plate, the peripheral portion of the cover plate including the sealing member is interposed between an upper end portion of the first housing and a lower end portion of the second housing to closely adhere thereto, and inner ends of the sealing member protrude inwardly further than inner wall surfaces of the first housing and the second housing to be coupled thereto.

21. A coolant heater comprising:

a heating element for heating a coolant;

a first housing for accommodating the heating element;

a cover plate for sealing the first housing in which the heating element is accommodated;

a temperature fuse provided in an external space formed by coupling the first housing and the cover plate, and disposed to be adjacent to the cover plate;

a second housing for pressing the temperature fuse to be pressurized toward the cover plate; and a sealing member fitted around a peripheral portion of the cover plate to cover an entire edge of the cover plate, and formed to cover all three surfaces at the peripheral portion of the cover plate, wherein, in a state in which the sealing member is fitted around the peripheral portion of the cover plate, the peripheral portion of the cover plate including the sealing member is interposed between an upper end portion of the first housing and a lower end portion of the second housing to closely adhere thereto, and the sealing member includes a through hole penetrating through both surfaces thereof to enable communication between an inner space into which the cover plate is inserted and the outside.

* * * * *